(12) United States Patent
Karidi

(10) Patent No.: US 11,743,214 B2
(45) Date of Patent: **\*Aug. 29, 2023**

(54) SYSTEM AND METHOD FOR PERFORMING FOLLOW UP BASED ON USER INTERACTIONS

(71) Applicant: LIVEPERSON, INC., New York, NY (US)

(72) Inventor: Ron Karidi, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,643

(22) Filed: Jun. 14, 2022

(65) Prior Publication Data
US 2023/0039013 A1   Feb. 9, 2023

Related U.S. Application Data

(63) Continuation of application No. 15/912,761, filed on Mar. 6, 2018, now Pat. No. 11,394,670, which is a
(Continued)

(51) Int. Cl.
| | |
|---|---|
| H04L 51/04 | (2022.01) |
| H04L 67/02 | (2022.01) |
| H04L 67/50 | (2022.01) |
| G06F 21/62 | (2013.01) |
| G06F 16/958 | (2019.01) |

(52) U.S. Cl.
CPC ............ *H04L 51/04* (2013.01); *G06F 16/972* (2019.01); *G06F 21/6263* (2013.01); *H04L 67/02* (2013.01); *H04L 67/535* (2022.05)

(58) Field of Classification Search
CPC ....... H04L 51/04; H04L 67/535; H04L 67/02; G06F 21/6263; G06F 16/972
See application file for complete search history.

(56) References Cited

U.S. PATENT DOCUMENTS

| | | | |
|---|---|---|---|
| 5,450,537 A | 9/1995 | Hirai et al. | |
| 5,517,405 A | 5/1996 | McAndrew et al. | |

(Continued)

FOREIGN PATENT DOCUMENTS

| | | |
|---|---|---|
| CN | 102143235 | 8/2011 |
| CN | 104394191 | 3/2015 |

(Continued)

OTHER PUBLICATIONS

Chartrand Sabra, "A new system seeks to ease the bottleneck in the customer-service information highway," The New York Times (Apr. 30, 2001), 2 pages.

(Continued)

*Primary Examiner* — Azizul Choudhury
(74) *Attorney, Agent, or Firm* — Polsinelli LLP

(57) ABSTRACT

A system and method for follow up management comprising determining if a user has a repository record, extracting information from the repository record associated with the user, and acting on information stored in the repository record. The method may be practiced on a system for managing online interaction comprising a business rules engine a follow up repository, and a follow up engine.

21 Claims, 4 Drawing Sheets

Related U.S. Application Data continuation of application No. 15/409,720, filed on Jan. 19, 2017, now Pat. No. 9,948,582, which is a continuation of application No. 14/970,225, filed on Dec. 15, 2015, now Pat. No. 9,590,930, which is a continuation of application No. 14/244,830, filed on Apr. 3, 2014, now Pat. No. 9,525,745, which is a continuation of application No. 11/360,530, filed on Feb. 24, 2006, now Pat. No. 8,738,732.

(60) Provisional application No. 60/717,212, filed on Sep. 15, 2005, provisional application No. 60/716,535, filed on Sep. 14, 2005.

(56) References Cited

U.S. PATENT DOCUMENTS

| | | |
|---|---|---|
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,796,952 A | 8/1998 | Davis |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |

(56) References Cited

U.S. PATENT DOCUMENTS

| | | |
|---|---|---|
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,195,426 B1 | 2/2001 | Bolduc et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,230,121 B1 | 5/2001 | Weber |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shaflee et al. |
| 6,778,982 B1 | 8/2004 | Knight |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,013,329 B1 | 3/2006 | Paul et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 | 10/2006 | Hamilton |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,467,349 B1 | 12/2008 | Bryar et al. |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 | 6/2009 | Marsh |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1 | 6/2010 | Kalogeraki |

(56) References Cited

U.S. PATENT DOCUMENTS

| | | |
|---|---|---|
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,895,193 B2 | 2/2011 | Cucerzan |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,065,666 B2 | 11/2011 | Schnabele |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,321,906 B2 | 11/2012 | Agrusa |
| 8,386,340 B1 | 2/2013 | Feinstein |
| 8,386,509 B1 | 2/2013 | Scofield |
| 8,392,580 B2 | 3/2013 | Allen et al. |
| 8,478,816 B2 | 7/2013 | Parks et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,812,601 B2 | 8/2014 | Hsueh et al. |
| 8,843,481 B1 | 9/2014 | Xu |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,247,066 B1 | 1/2016 | Stec et al. |
| 9,256,761 B1 | 2/2016 | Sahu |
| 9,331,969 B2 | 5/2016 | Barak et al. |
| 9,336,487 B2 | 5/2016 | Lahav |
| 9,350,598 B2 | 5/2016 | Barak et al. |
| 9,396,295 B2 | 7/2016 | Lahav et al. |
| 9,396,436 B2 | 7/2016 | Lahav |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 9,672,196 B2 | 6/2017 | Shachar et al. |
| 9,767,212 B2 | 9/2017 | Lavi et al. |
| 9,819,561 B2 | 11/2017 | Freishtat et al. |
| 9,892,417 B2 | 2/2018 | Shachar et al. |
| 9,948,582 B2 | 4/2018 | Karidi |
| 10,038,683 B2 | 7/2018 | Barak et al. |
| 10,142,908 B2 | 11/2018 | Barak et al. |
| 10,191,622 B2 | 1/2019 | Karidi et al. |
| 10,278,065 B2 | 4/2019 | Stuber et al. |
| 11,394,670 B2 | 7/2022 | Karidi |
| 2001/0001150 A1 | 5/2001 | Miloslavsky |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0099694 A1 | 7/2002 | Diamond et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0249650 A1 | 12/2004 | Freedman |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James et al. |
| 2005/0044149 A1 | 2/2005 | Regardie et al. |
| 2005/0091254 A1 | 4/2005 | Stabb |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |

(56) References Cited

U.S. PATENT DOCUMENTS

| | | |
|---|---|---|
| 2005/0102257 A1 | 5/2005 | Onyon et al. |
| 2005/0114195 A1 | 5/2005 | Bernasconi |
| 2005/0131944 A1 | 6/2005 | Edward |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1* | 1/2006 | Rijsinghani ........ G06Q 30/0201 705/7.29 |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Chen |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Berg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0112958 A1 | 5/2007 | Kim |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0214048 A1 | 9/2007 | Chan |
| 2007/0220092 A1 | 9/2007 | Heitzeberg et al. |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1* | 2/2008 | Roker ................ G06Q 30/0275 705/14.66 |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0028047 A1 | 1/2009 | Schmidt |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0004888 A1 | 1/2011 | Srinivasan et al. |
| 2011/0041168 A1 | 2/2011 | Murray et al. |
| 2011/0055207 A1 | 3/2011 | Schorzman et al. |
| 2011/0055309 A1 | 3/2011 | Gibor et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0270934 A1 | 11/2011 | Wong et al. |
| 2011/0271175 A1 | 11/2011 | Lavi et al. |
| 2011/0271183 A1 | 11/2011 | Bose et al. |
| 2011/0300331 A1 | 12/2011 | Richard et al. |
| 2011/0320715 A1 | 12/2011 | Ickman et al. |
| 2012/0012358 A1 | 1/2012 | Horan et al. |
| 2012/0036200 A1 | 2/2012 | Cole |
| 2012/0042389 A1 | 2/2012 | Bradley et al. |

(56) References Cited

U.S. PATENT DOCUMENTS

| | | |
|---|---|---|
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0013990 A1 | 1/2013 | Green |
| 2013/0036202 A1 | 2/2013 | Lahav |
| 2013/0050392 A1 | 2/2013 | Chiang |
| 2013/0054707 A1 | 2/2013 | Muszynski et al. |
| 2013/0080961 A1 | 3/2013 | Levien et al. |
| 2013/0117276 A1 | 5/2013 | Hedditch |
| 2013/0117380 A1 | 5/2013 | Pomazanov et al. |
| 2013/0117804 A1 | 5/2013 | Chawla |
| 2013/0125009 A1 | 5/2013 | DeLuca |
| 2013/0132194 A1 | 5/2013 | Rajaram |
| 2013/0136253 A1 | 5/2013 | Liberman |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0250354 A1 | 9/2013 | Kato |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0058721 A1 | 2/2014 | Becerra |
| 2014/0068011 A1 | 3/2014 | Zhang et al. |
| 2014/0094134 A1 | 4/2014 | Balthasar |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0278795 A1 | 9/2014 | Satyamoorthy |
| 2014/0310229 A1 | 10/2014 | Lahav et al. |
| 2014/0331138 A1 | 11/2014 | Overton et al. |
| 2014/0372240 A1 | 12/2014 | Freishtat et al. |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0082345 A1 | 3/2015 | Archer |
| 2015/0101003 A1 | 4/2015 | Bull |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0198509 A1 | 7/2016 | Hayes, Jr. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0206568 A1 | 7/2017 | Schachar et al. |
| 2017/0230505 A1 | 8/2017 | McCarthy-Howe |

FOREIGN PATENT DOCUMENTS

| | | |
|---|---|---|
| EP | 840244 A1 | 5/1998 |
| EP | 1233361 A1 | 8/2002 |
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Just Answer (2004 Faq) Archive.org cache of www.justanswer.com circa (Dec. 2004), 8 pages.

Pack Thomas, "Human Search Engines the next Killer app," (Dec. 1, 2000) Econtent DBS vol. 23; Issue 6, 7 pages.

match.com "Match.com Launches Match.com Advisors," PR Newswire (Oct. 14, 2003), 2 pages.

Sitel, "Sitel to Provide Live Agent Support Online for Expertcity. com," PR Newswire (Feb. 28, 2000), 2 pages.

Webmaster World, "Link to my website is in a frame with banner ad at the top," www.webmasterworld.com (Nov. 11, 2003), 2 pages.

Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).

Fairisaac, "How SmartForms for Blaze Advisor Works," www.fairisaac.com 12 pages (Jan. 2005).

Mesbah A et al., "A Component- and Push-Based Architectural Style for Ajax Applications," The Journal of Systems & Software, 81 (12): pp. 2194-2209, Elsevier North Holland, New York, NY US (Dec. 2008).

Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.

"OAuth core 1.0 Revision A [XP002570263]," OAuth Core Workgroups, pp. 1-27 www.ouath.net/core/1.0a/ (retrieved Jan. 31, 2013), 24 pages.

Anon., "AnswerSoft Announces Concerto; First to Combine Call Center Automation with Power of Web," Business Wire, (Feb. 3, 1997) 3 pages.

Emigh, J., "AnswerSoft Unveils Concerto for Web-Based Call Centers Feb. 5, 1996," Newsbytes, (Feb. 5, 1997) 2 pages.

Grigonis, R., "Webphony—It's not Just Callback Buttons Anymore," Computer Telephony, (Dec. 1997) 4 pages.

Wagner, M., "Caring for Customers," Internet World, (Sep. 1, 1999) 3 pages.

(56) References Cited

OTHER PUBLICATIONS

Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, Aug. 1995 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_ File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update-Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards- and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-_inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources- Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.

(56) References Cited

OTHER PUBLICATIONS

Plaintiffs Original Complaint, *Nextcard, LLC v. Liveperson, Inc.*; Civil Action No. 2:08-cv- 00184-TJW, in the U.S. District Court for the Eastern District of Texas, Marshall Division, filed Apr. 30, 2008 (7 pages).
Amended Complaint and Jury Demand; *Liveperson, Inc. v. Nextcard, LLC, et al*; Civil Action No. 08-062 (GMS), in the U.S. District Court for the District of Delaware, filed Mar. 18, 2008 (5 pages).
Plaintiffs Second Amended Complaint; *Nextcard, LLC v. American Express Company, et al*; Civil Action No. 2:07-cv-354 (TJW); in the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC v. American Express Company, et al*; Civil Action No. 2:07-cv-354 (TJW); in the U.S. District Court for the Eastern District of Texas, Marshall Division filed (Apr. 28, 2008), 13 pages.
Answer and Counterclaims of Defendant DFS Services LLC; *Nextcard, LLC v. American Express Company, et al*; Civil Action No. 2:07-cv-354 (TJW); in the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC v. American Express Company, et al*; Civil Action No. 2:07-cv-354 (TJW); in the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; *Nextcard, LLC v. American Express Company, et al*; Civil Action No. 2:07-cv-354 (TJW); in the U.S. District Court for the Eastern District of Texas, Marshall Division, filed May 14, 2008, 5 pages.
Plaintiffs Second Amended Reply to Counterclaims of Defendant *DFS Services LLC; Nextcard, LLC v. American Express Company, et al*; Civil Action No. 2:07-cv-354 (TJW); in the U.S. District Court for the Eastern District of Texas, Marshall Division, filed May 14, 2008 (71 pages).
Plaintiffs Second Amended Reply to Counterclaims of Defendant American Express Company; *Nextcard, LLC v. American Express Company, et al*; Civil Action No. 2:07-cv-354 (TJW); in the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc., "PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
EDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM Sigmetrics Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar., 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, dated Jul. 30, 2013, 9 pages.
International Search Report and Written Opinion for PCT Application No. PCT/US2013/037086, dated Jul. 12, 2013, 9 pages.
International Search Report and Written Opinion for PCT Application No. PCT/US2013/29389, dated Jul. 24, 2013, 8 pages.
International Search Report and Written Opinion for PCT Application No. PCT/US2013/038212, dated Jul. 17, 2013, 11 pages.
International Search Report for PCT Application No. PCT/US03/41090, dated Sep. 1, 2004, 3 pages.
International Search Report for PCT Application No. PCT/US05/40012, dated Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, dated Jul. 7, 2011, 3 pages.
International Search Report for PCT Application No. PCT/US2011/064946, dated Jun. 22, 2012, 3 pages.
International Preliminary Report on Patentability for PCT Application No. PCT/US2011/031239, dated Oct. 9, 2012, 8 pages.
International Search Report and Written Opinion for PCT Application No. PCT/US14/49822, dated Feb. 27, 2015, 11 pages.

(56) References Cited

OTHER PUBLICATIONS

Extended European Search Report dated Jul. 7, 2015 for European Patent Application No. 15161694.3; 8 pages.
International Preliminary Report on Patentability for PCT Application No. PCT/US2014/049822, dated Feb. 18, 2016, 7 pages.
International Search Report and Written Opinion for PCT Application No. PCT/US2016/035535, dated Aug. 8, 2016, 11 pages.
International Search Report and Written Opinion dated Nov. 7, 2017 for PCT Application No. PCT/US2017/046550, 16 pages.
Non-Final Office Action dated Dec. 11, 2008 for U.S. Appl. No. 11/394,078, 15 pages.
Final Office Action dated Jul. 9, 2009 for U.S. Appl. No. 11/394,078, 15 pages.
Non-Final Office Action dated Jan. 28, 2010 for U.S. Appl. No. 11/394,078, 14 pages.
Final Office Action dated Jul. 9, 2010 for U.S. Appl. No. 11/394,078, 16 pages.
Non-Final Office Action dated Feb. 1, 2011 for U.S. Appl. No. 11/394,078, 20 pages.
Final Office Action dated Aug. 2, 2011 for U.S. Appl. No. 11/394,078, 23 pages.
Non-Final Office Action dated May 16, 2012 for U.S. Appl. No. 11/394,078, 23 pages.
Final Office Action dated Jan. 25, 2013 for U.S. Appl. No. 11/394,078, 22 pages.
Non-Final Office Action dated Jun. 22, 2012 for U.S. Appl. No. 13/080,324, 9 pages.
Non-Final Office Action dated Aug. 15, 2012 for U.S. Appl. No. 12/967,782, 31 pages.
Non-Final Office Action dated Jul. 29, 2011 for U.S. Appl. No. 12/608,117, 20 pages.
Final Office Action dated Apr. 4, 2012 for U.S. Appl. No. 12/608,117, 25 pages.
Non-Final Office Action dated Apr. 24, 2004 for U.S. Appl. No. 09/922,753, 16 pages.
Final Office Action dated Oct. 14, 2004 for U.S. Appl. No. 09/922,753, 13 pages.
Non-Final Office Action dated May 17, 2005 for U.S. Appl. No. 09/922,753, 13 pages.
Non-Final Office Action dated Mar. 14, 2006 for U.S. Appl. No. 09/922,753, 13 pages.
Final Office Action dated Jul. 26, 2006 for U.S. Appl. No. 09/922,753, 13 pages.
Non-Final Office Action dated Aug. 13, 2008 for U.S. Appl. No. 09/922,753, 10 pages.
Final Office Action dated Apr. 23, 2009 for U.S. Appl. No. 09/922,753, 11 pages.
Non-Final Office Action dated Jul. 21, 2009 for U.S. Appl. No. 09/922,753, 10 pages.
Final Office Action dated Feb. 18, 2010 for U.S. Appl. No. 09/922,753, 9 pages.
Non-Final Office Action dated Apr. 25, 2011 for U.S. Appl. No. 09/922,753, 9 pages.
Final Office Action dated Nov. 25, 2011 for U.S. Appl. No. 09/922,753, 10 pages.
Non-Final Office Action dated Aug. 7, 2007 for U.S. Appl. No. 10/980,613, 16 pages.
Non-Final Office Action dated May 15, 2008 for U.S. Appl. No. 10/980,613, 23 pages.
Non-Final Office Action dated Apr. 30, 2012 for U.S. Appl. No. 12/504,265, 16 pages.
Final Office Action dated Aug. 28, 2012 for U.S. Appl. No. 12/504,265, 28 pages.
Final Office Action dated Feb. 14, 2013 for U.S. Appl. No. 13/080,324, 11 pages.
Non-Final Office Action dated Mar. 30, 2013 for U.S. Appl. No. 11/360,530, 23 pages.
Final Office Action dated Apr. 11, 2013 for U.S. Appl. No. 12/967,782, 18 pages.
Non-Final Office Action dated May 10, 2013 for U.S. Appl. No. 13/563,708, 20 pages.
Non-Final Office Action dated Jun. 12, 2013 for U.S. Appl. No. 12/608,117, 56 pages.
Non-Final Office Action dated Jun. 20, 2013 for U.S. Appl. No. 13/157,936, 19 pages.
Non-Final Office Action dated Jun. 27, 2013 for U.S. Appl. No. 12/504,265, 11 pages.
Non-Final Office Action dated Jul. 8, 2013 for U.S. Appl. No. 13/413,197, 10 pages.
Final Office Action dated Oct. 21, 2013 for U.S. Appl. No. 12/504,265 14 pages.
Non-Final Office Action dated Oct. 30, 2013 for U.S. Appl. No. 13/961,072, 10 pages.
Non-Final Office Action dated Dec. 5, 2013 for U.S. Appl. No. 12/967,782, 14 pages.
Non-Final Office Action dated Dec. 4, 2014 for U.S. Appl. No. 14/275,698, 6 pages.
Notice of Allowance dated Jan. 3, 2014 for U.S. Appl. No. 11/360,530, 29 pages.
Final Office Action dated Jan. 22, 2014 for U.S. Appl. No. 12/608,117, 45 pages.
Final Office Action dated Jan. 27, 2014 for U.S. Appl. No. 13/563,708, 35 pages.
Non-Final Office Action dated Jan. 30, 2014 for U.S. Appl. No. 13/413,158, 19 pages.
Notice of Allowance dated Feb. 12, 2014 for U.S. Appl. No. 13/157,936, 33 pages.
Final Office Action dated Feb. 19, 2014 for U.S. Appl. No. 13/961,072, 35 pages.
Non-Final Office Action dated Feb. 20, 2014 for U.S. Appl. No. 10/980,613, 43 pages.
Notice of Allowance dated Feb. 28, 2014 for U.S. Appl. No. 09/922,753, 13 pages.
Notice of Allowance dated Mar. 25, 2014 for U.S. Appl. No. 12/504,265 31 pages.
Notice of Allowance dated Mar. 31, 2014 for U.S. Appl. No. 12/725,999, 41 pages.
Notice of Allowance dated Mar. 30, 2015 for U.S. Appl. No. 14/275,698, 11 pages.
Notice of Allowance dated Apr. 1, 2014 for U.S. Appl. No. 13/413,197, 32 pages.
Non-Final Office Action dated Jul. 17, 2014 for U.S. Appl. No. 11/394,078, 41 pages.
Non-Final Office Action dated Jul. 31, 2014 for U.S. Appl. No. 13/080,324, 38 pages.
Notice of Allowance dated Aug. 18, 2014 for U.S. Appl. No. 12/967,782, 43 pages.
Non-Final Office Action dated Aug. 21, 2014 for U.S. Appl. No. 10/980,613, 43 pages.
Final Office Action dated Mar. 12, 2015 for U.S. Appl. No. 13/080,324, 13 pages.
Non-Final Office Action dated Mar. 13, 2015 for U.S. Appl. No. 13/841,434, 26 pages.
Non-Final Office Action dated Apr. 9, 2015 for U.S. Appl. No. 13/830,719, 24 pages.
Final Office Action dated Apr. 7, 2015 for U.S. Appl. No. 11/394,078, 18 pages.
Non-Final Office Action dated Apr. 6, 2015 for U.S. Appl. No. 14/322,736, 13 pages.
Non-Final Office Action dated May 7, 2015 for U.S. Appl. No. 13/829,708, 16 pages.
Final Office Action dated May 8, 2015 for U.S. Appl. No. 10/980,613, 18 pages.
Non-Final Office Action dated May 13, 2015 for U.S. Appl. No. 14/317,346, 21 pages.
Non-Final Office Acton dated Jun. 2, 2015 for U.S. Appl. No. 12/608,117, 26 pages.
First Action Pre-Interview Communication dated Jun. 19, 2015 for U.S. Appl. No. 14/244,830, 7 pages.
Non-Final Office Action dated Jul. 20, 2015 for U.S. Appl. No. 14/711,609; 12 pages.

(56) References Cited

OTHER PUBLICATIONS

Non-Final Office Action dated Jul. 20, 2015 for U.S. Appl. No. 14/500,537; 12 pages.
Final Office Action dated Jul. 31, 2015 for U.S. Appl. No. 14/317,346, 13 pages.
Final Office Action dated Aug. 10, 2015 for U.S. Appl. No. 13/961,072, 12 pages.
Non-Final Office Action dated Aug. 14, 2015 for U.S. Appl. No. 14/543,397, 12 pages.
Non-Final Office Action dated Aug. 18, 2015 for U.S. Appl. No. 14/570,963, 23 pages.
Non-Final Office Action dated Aug. 27, 2015 for U.S. Appl. No. 11/394,078, 21 pages.
Non-Final Office Action dated Sep. 11, 2015 for U.S. Appl. No. 14/500,502; 12 pages.
Final Office Action dated Sep. 18, 2015 for U.S. Appl. No. 14/288,258, 17 pages.
Notice of Allowance dated Sep. 18, 2015 for U.S. Appl. No. 14/244,830, 11 pages.
First Action Interview Pilot Program Pre-Interview Communication dated Oct. 21, 2015 for U.S. Appl. No. 14/313,511, 3 pages.
Final Office Action dated Oct. 22, 2015 for U.S. Appl. No. 13/830,719, 29 pages.
Final Office Action dated Nov. 10, 2015 for U.S. Appl. No. 13/841,434; 30 pages.
Final Office Acton dated Nov. 17, 2015 for U.S. Appl. No. 12/608,117, 32 pages.
Non-Final Office Action dated Dec. 4, 2015 for U.S. Appl. No. 10/980,613 21 pages.
Non-Final Office Action dated Dec. 24, 2015 for U.S. Appl. No. 14/317,346, 15 pages.
Notice of Allowance dated Dec. 30, 2015 for U.S. Appl. No. 14/322,736, 9 pages.
Non-Final Office Action dated Jan. 5, 2016 for U.S. Appl. No. 14/245,400, 33 pages.
Notice of Allowance dated Jan. 7, 2016 for U.S. Appl. No. 14/313,511, 5 pages.
First Action Pre-Interview Communication dated Jan. 12, 2016 for U.S. Appl. No. 14/753,496, 3 pages.
Notice of Allowance dated Jan. 20, 2016 for U.S. Appl. No. 13/829,708, 11 pages.
Final Office Action dated Jan. 29, 2016 for U.S. Appl. No. 14/711,609; 15 pages.
Final Office Action dated Jan. 29, 2016 for U.S. Appl. No. 14/500,537; 15 pages.
Non-Final Office Action dated Feb. 12, 2016 for U.S. Appl. No. 13/080,324, 15 pages.
Notice of Allowance dated Mar. 16, 2016 for U.S. Appl. No. 14/582,550; 9 pages.
Notice of Allowance dated Mar. 21, 2016 for U.S. Appl. No. 14/753,496; 5 pages.
Final Office Action dated Apr. 14, 2016 for U.S. Appl. No. 10/980,613, 21 pages.
Final Office Action dated Apr. 21, 2016 for U.S. Appl. No. 14/317,346, 17 pages.
Non-Final Office Action dated Apr. 22, 2016 for U.S. Appl. No. 14/288,258 11 pages.
Notice of Allowance dated Apr. 22, 2016 for U.S. Appl. No. 11/394,078, 16 pages.
Non-Final Office Action dated May 12, 2016 for U.S. Appl. No. 13/961,072, 12 pages.
Non-Final Office Acton dated May 23, 2016 for U.S. Appl. No. 12/608,117, 35 pages.
Final Office Action dated Jun. 9, 2016 for U.S. Appl. No. 14/543,397, 18 pages.
Final Office Action dated Jun. 17, 2016 for U.S. Appl. No. 14/570,963, 18 pages.
Notice of Allowance dated Jun. 23, 2016 for U.S. Appl. No. 13/830,719; 26 pages.
Final Office Action dated Jun. 28, 2016 for U.S. Appl. No. 14/500,502, 10 pages.
Final Office Action dated Jul. 12, 2016 for U.S. Appl. No. 14/245,400, 36 pages.
First Action Pre-Interview Communication dated Jul. 14, 2016 for U.S. Appl. No. 14/970,225.
Final Office Action dated Sep. 8, 2016 for U.S. Appl. No. 13/080,324, 15 pages.
Notice of Allowance dated Sep. 21, 2016 for U.S. Appl. No. 14/711,609, 22 pages.
Notice of Allowance dated Sep. 22, 2016 for U.S. Appl. No. 14/500,537, 19 pages.
Notice of Allowance dated Sep. 23, 2016 for U.S. Appl. No. 13/841,434, 15 pages.
Notice of Allowance dated Sep. 30, 2016 for U.S. Appl. No. 14/317,346, 19 pages.
Notice of Allowance dated Oct. 7, 2016 for U.S. Appl. No. 14/288,258, 10 pages.
Non-Final Office Action dated Jan. 13, 2017 for U.S. Appl. No. 14/543,397, 19 pages.
Non-Final Office Action dated Jan. 9, 2017 for U.S. Appl. No. 14/570,963, 16 pages.
Notice of Allowance dated Jan. 13, 2017 for U.S. Appl. No. 15/294,441, 10 pages.
Pre-Interview First Office Action dated Apr. 3, 2017 for U.S. Appl. No. 15/384,895, 7 pages.
Non-Final Office Action dated Mar. 27, 2017 for U.S. Appl. No. 14/245,400; 43 pages.
Notice of Allowance dated May 22, 2017 for U.S. Appl. No. 13/080,324; 10 pages.
Non-Final Office Action dated Jul. 17, 2017 for U.S. Appl. No. 15/131,777; 11 pages.
Non-Final Office Action dated Sep. 7, 2017 for U.S. Appl. No. 15/273,863, 29 pages.
Pre-Interview First Office Action dated Sep. 11, 2017 for U.S. Appl. No. 15/409,720, 6 pages.
Final Office Action dated Sep. 22, 2017 for U.S. Appl. No. 14/543,397, 18 pages.
Non-Final Office Action dated Sep. 25, 2017 for U.S. Appl. No. 15/632,069, 12 pages.
Final Office Action dated Oct. 6, 2017 for U.S. Appl. No. 14/570,963, 17 pages.
Notice of Allowance dated Oct. 2, 2017 for U.S. Appl. No. 15/595,590, 9 pages.
Notice of Allowance dated Dec. 8, 2017 for U.S. Appl. No. 15,409,720, 9 pages.
Final Office Action dated Jan. 4, 2018 for U.S. Appl. No. 14/245,400; 22 pages.
Final Office Action dated Jan. 9, 2018 for U.S. Appl. No. 15/384,895, 10 pages.
Non-Final Office Action dated Feb. 8, 2018 for U.S. Appl. No. 14/570,963; 25 pages.
Non-Final Office Action dated Mar. 19, 2018 for U.S. Appl. No. 15/084,133; 16 pages.
Non-Final Office Action dated Jun. 4, 2018 for U.S. Appl. No. 15/682,186; 13 pages.
Non-Final Office Action dated Jul. 12, 2018 for U.S. Appl. No. 15/860,378; 7 pages.
Final Office Action dated Jul. 11, 2018 for U.S. Appl. No. 15/273,863; 29 pages.
Notice of Allowance dated Jul. 23, 2018 for U.S. Appl. No. 15/171,525; 14 pages.
Notice of Allowance dated Sep. 12, 2018 for U.S. Appl. No. 15/213,776; 8 pages.
Non-Final Office Action dated Oct. 4, 2018 for U.S. Appl. No. 15/389,598; 21 pages.
Final Office Action dated Dec. 13, 2018 for U.S. Appl. No. 14/570,963; 32 pages.
Non-Final Office Action dated Jan. 24, 2019 for U.S. Appl. No. 15/273,863; 29 pages.
Notice of Allowance dated Feb. 1, 2019 for U.S. Appl. No. 15/084,133; 8 pages.

(56) References Cited

OTHER PUBLICATIONS

Notice of Allowance dated Feb. 28, 2019 for U.S. Appl. No. 15/860,378; 7 pages.
Non-Final Office Action dated Mar. 7, 2019 for U.S. Appl. No. 15/682,186; 12 pages.
Final Office Action dated Apr. 25, 2019 for U.S. Appl. No. 14/245,400; 25 pages.
Final Office Action dated May 14, 2019 for U.S. Appl. No. 15/389,598; 19 pages.
Non-Final Office Action dated Jun. 25, 2019 for U.S. Appl. No. 16/218,052; 8 pages.
Non-Final Office Action dated Aug. 7, 2019 for U.S. Appl. No. 16/353,321; 10 pages.
Final Office Action dated Aug. 7, 2019 for U.S. Appl. No. 15/273,863; 33 pages.
Notice of Allowance dated Aug. 14, 2019 for U.S. Appl. No. 15/384,895; 8 pages.
Non-Final Office Action dated Sep. 20, 2019 for U.S. Appl. No. 15/682,186; 13 pages.
Non-Final Office Action dated Dec. 4, 2019 for U.S. Appl. No. 15/182,310; 8 pages.
Non-Final Office Action dated Dec. 31, 2019 for U.S. Appl. No. 16/026,603; 7 pages.
Final Office Action dated Nov. 4, 2019 for U.S. Appl. No. 16/353,321; 14 pages.
Non-Final Office Action dated Mar. 17, 2020 for U.S. Appl. No. 15/273,863; 25 pages.
Final Office Action dated Apr. 9, 2020 for U.S. Appl. No. 16/218,052; 15 pages.
Non-Final Office Action dated Oct. 2, 2020 for U.S. Appl. No. 15/912,761; 8 pages.
Final Office Action dated Jun. 10, 2021 for U.S. Appl. No. 15/912,761; 11 pages.
Notice of Allowance dated Mar. 21, 2022 for U.S. Appl. No. 15/912,761; 11 pages.

* cited by examiner

Fig. 2

| Visitor ID | Date Record Set | Database Record Expiration |
|---|---|---|

| Visitor ID | Account ID | Session ID | Ticket ID | Followup Date | Expiration Date | Recovery Mode | Content | Creation Date |
|---|---|---|---|---|---|---|---|---|

```
<cmd>   data </cmd>
        .
        .
        .
        .
        .
<display-popup> popup-url=XXXXXX.XXX </display-popup>
<set-variables>  promotion-id=ts </set-variables>
```

SYSTEM AND METHOD FOR PERFORMING FOLLOW UP BASED ON USER INTERACTIONS

CROSS REFERENCE TO RELATED APPLICATIONS

This application is a continuation of U.S. patent application Ser. No. 15/912,761 filed Mar. 6, 2018, which is a continuation of U.S. patent application Ser. No. 15/409,720 filed Jan. 19, 2017, which a is a continuation of U.S. patent application Ser. No. 14/970,225 filed on Dec. 15, 2015, which is a continuation of U.S. patent application Ser. No. 14/244,830 filed on Apr. 3, 2014, which is a continuation of U.S. patent application Ser. No. 11/360,530 filed on Feb. 24, 2006, which claims priority to U.S. Provisional Application No. 60/716,535, filed Sep. 14, 2005, and U.S. Provisional Patent Application No. 60/717,212, filed Sep. 15, 2005. The subject matter of all of the foregoing patent applications is incorporated herein by reference in their entirety and for all purposes.

FIELD OF THE INVENTION

The present invention relates to computer browsing and, more particularly, to providing an appropriate follow up based on the interaction.

BACKGROUND OF THE INVENTION

Networks, such as the Internet, have become an increasingly important part of our everyday lives. Millions of people now access the Internet on a daily basis to shop for goods and services and obtain information of interest.

The web is built on a very simple, but powerful premise. Much of the material on the web is formatted in a general, uniform format called HTML (Hypertext Markup Language) or the like, and all information requests and responses conform to a similarly standard protocol. When someone accesses a server on the Web, the user's Web browser will send an information request to a Web server. The Web server will respond to the request by transmitting the desired information to the user's computer. There, the user's browser will display the received information on the user's screen.

For example, suppose an individual wishes to purchase a printer via the Internet. The individual accesses the Internet and types in a vendor's uniform resource locator (URL). The individual may then access that vendor's home page to determine whether the vendor has the product that this individual wishes to purchase.

If the individual does not know which vendors sell printers, the individual may access a web site associated with a search engine. The individual enters the generic term "printer" into the search engine to attempt to locate a vendor that sells printers. Using a search engine in this manner to locate individual web sites that offer the desired product or service often results in a list of hundreds or even thousands of "hits," where each hit may correspond to a web page that relates to the search term.

Once a user decides which web page to visit, the web page is formulated to interest the user. In particular, many web pages allow a user to customize the web pager so that each time the user visits the web page, the customized web page is presented to the user. One of the challenges of online interactions is providing customers or users with consistent online experience while using different channels such as website navigation, email, chat, bulletin boards, discussion forums, chat, and the like. For this uniform presentation, cookies are used.

Cookies are pieces of information generated by a web server and stored in the user's computer, for future access. Cookies are embedded in the http information flowing back and forth between the user's computer and the servers. Cookies allow user-side customization of web information. For example, cookies are used to personalize web search engines, to allow users to participate in WWW-wide contests, to store shopping lists of items a user has selected while browsing through a virtual shopping mall, and the like.

Essentially, cookies make use of user-specific information transmitted by the web server onto the user's computer so that the information might be available for later access by itself or other servers. Typically, the servers are part of the same domain. In most cases, not only does the storage of personal information into a cookie go unnoticed, so does access to it. Web servers automatically gain access to relevant cookies whenever the user establishes a connection to them, usually in the form of web requests.

For a server to use cookies, first the Web server creates a specific cookie, which is essentially a tagged string of text containing the user's preferences, and it transmits this cookie to the user's computer. The cookie is then stored in the user's computer. The user's web browser receives the cookie and stores it in a special file called a cookie list. This usually happens without any notification or user involvement. Next, the cookie is automatically transferred from the user's machine to a web server. Whenever a user directs the web browser to display a certain web page from the server from which it already has a cookie, the browser will, transmit the cookie containing the user's personal information to the web server.

There are many reasons a given site would wish to use cookies. These range from the ability to personalize information, help with on-line sales/services, or simply for the purposes of collecting demographic information. Cookies also provide programmers with a quick and convenient means of keeping site content fresh and relevant to the user's interests. The newest servers use cookies to help with back-end interaction as well, which can improve the utility of a site by being able to securely store any personal data that the user has shared with a site to help with quick logins, and the like.

Usually, a cookie contains more than simply a name and a value. In fact, a cookie can have 6 parameters: the name of the cookie, the value of the cookie, the expiration date of the cookie, the path the cookie is valid for, the domain the cookie is valid for, and the need for a secure connection to exist to use the cookie.

Two of these parameters are mandatory the cookie's name and its value. The other four can be set manually or automatically. Each parameter is separated by a semicolon when set explicitly. The name of a cookie and its value are set simply by pairing them together. The value of a cookie can also be null, for the purpose of clearing the cookie value.

The expiration parameter determines the lifetime of the cookie. For example, the cookie can state "expires=Mon, 1 Jan. 2001 00:00:00 GMT." If "expires" is not set explicitly, the default expiration is the end-of-session. The length of a session can vary depending on browsers and servers, but generally a session is the length of time that the browser is open, even if the user is no longer at that site.

The path parameter sets the URL path within which the cookie is valid. Pages outside of that path cannot read or use the cookie. If Path is not set explicitly, then it defaults to the URL path of the document creating the cookie. The domain parameter takes the flexibility of the path parameter one step further. If a site uses multiple servers within a domain it is important to make the cookie accessible to pages on any of these servers. Generally, the server issuing the cookie is a member of the domain that it sets in the cookie. That is, a server called www.thisserver.com cannot typically set a cookie for the domain www.thatserver.com. If Domain is not set explicitly, then it defaults to the full domain of the document creating the cookie.

The last parameter is the secure parameter. The secure parameter is a flag indicating that a cookie should be used under secure server condition, such as SSL. Since most sites do not require secure connections, this parameter defaults to FALSE.

Often a consistent online experience requires the ability to recognize the customer or user across multiple interactions and recall, either in real-time or offline, the history of events and attributes associated with the customer or user. The recognition of customers or users, when applied to hundreds or thousands of online interactions a day, becomes a challenge, both from a business logic perspective and a technology perspective. Previous systems used business rules engines that parsed the activity of each visitor on the site. The activity was matched against a customized set of business rules. Once a selected rule was applied, an action that presents the site visitor with targeted content was triggered. Systems such as the LivePerson Sales Edition provided real time processing of business rules.

Traditionally, web systems that wanted to access history data about the visitor would access a database for each visitor to the site, only to find out that in most cases there is no meaningful information about the visitor that warrants a special treatment for that user. In the event that this visitor is new to the site, and therefore has no history, the database search wastes time and resources. Some systems can identify that the visitor is a new visitor, not having a site cookie, but would still access the database for all repeat visitors. For the repeat visitors, they would retrieve the history data, analyze it, and most times decide to offer the generic treatment.

In one prior art system, when the system identifies a user based on a previously stored cookie, the records associated with that user are pulled from memory and analyzed. The analysis is done when the user enters the website. Therefore, there is a delay between the user entering the website and when the appropriate action is taken after the system reviews the records and determines what to do based on those records. Alternatively, standard actions are taken for all users as they enter the site.

BRIEF SUMMARY OF THE INVENTION

The unique aspects of the disclosed system and method are related to the technological challenges of allowing web-servers real-time access to the CRM system. Using the disclosed system, web servers are more effective and only access the relevant data for the relevant visitors. A system is disclosed to provide a consistent online experience to users or customers visiting a web site.

There are three major modules in the disclosed system:
1. Business Rules Engine
2. follow up Repository
3. follow up Engine The first component is the business rules engine that processes, in real-time, the events associated with each customer and decides what business action is required. Business intelligence in the rules engine identifies whether a current visitor to the site requires follow up in a subsequent interaction. This information is stored together with what needs to be done, i.e., what follow up action has to be taken. In this manner, when a new visitor arrives on the site, a lookup is performed only if it is required. Moreover, the information stored in the previous session already indicates the action to be taken and reduces the need for additional real-time decision to be made.

There are at least three actions that can be taken, present (real-time) action, future follow up, and follow up on the user or customer's next visit. Preferably, future follow-ups are scheduled for a specific date and the follow-up channel is not the website. In one embodiment, a combination of actions are taken, i.e., present action with future follow up. The real-time action can include, but is not limited to presenting the user with a specific web page, presenting the user with a questionnaire, enabling a live chat, sending an event notification, and the like. The future follow up is by one or more of several communication methods such as outbound email, outbound phone, offline channel (mail), or the like. The phone follow up is an automated follow up, a live operator, or combination of the two and uses plain old telephone service (POTS) or voice over IP (VOIP).

The second component of the disclosed system is the follow up repository. The follow up repository is a data repository that associates visitor-identifying information with follow up content. In a preferred embodiment, the follow up repository is hosted on a database. The repository provides data management services controlling the size and aging of the stored data. In particular, items can be marked with an expiration date and size limits can be set. In one embodiment, the repository includes user contact information or links to where such information is stored. In another embodiment, follow up instructions are stored in the follow up repository.

The third component of the disclosed system is the follow up engine that is responsible for online and offline activities. The online activities include determining previous or outstanding follow up actions and establishing new follow up information and the offline activities include retrieving and acting on follow up instructions.

Specifically, when a visitor arrives at a website, the follow up engine detects whether the visitor has unexpired follow up information in the repository. When there is follow up information, the follow up engine retrieves the information and acts on it. In another embodiment, the follow up engine extracts information from the repository record and acts upon instructions stored in the repository record. When a visitor interacts with the website, the follow up engine determines whether to set or add follow up information to the visitor's follow up record. The follow up engine then determines the expiration date, if any, for that information. Depending on the follow up information, the expiration date can be as little as several hours (or less) or as long as one year (or more). In some situations, there may not be any expiration date. The follow up engine stores the expiration date of the visitor's follow up record on the visitor's cookie, thereby allowing the follow up engine to detect that the visitor has follow up information when the visitor returns to the website for a new visit. Using the follow up engine allows efficient determination of a website visitor's follow up information.

The follow up engine has offline functions in addition to the online functions when a user is visiting the web site. The follow up engine retrieves instructions and triggers follow up actions. In one embodiment, the follow up records stored in the follow up repository have a trigger date. The trigger date is the date a follow up action takes place. On the trigger date, the follow up engine pulls the follow up records and acts upon the instructions stored in the record. The actions the follow up engine can take include sending outbound email, initiating an outbound phone call (operator, automated, or a combination), initiating an offline channel activity (e.g. DM mailing), sending instructions to agents to take action, or the like.

The combination of these three components allows for an effective handling of large volumes of interactions required in today's online environment. The disclosed system and method addresses the challenge presented to website managers who are interested in accessing in real time the history of events and attributes associated with their customers.

BRIEF DESCRIPTION OF THE DRAWINGS

FIG. 2 represents a cookie used in the present system;
FIG. 3A represents the data stored in the database according to the present invention;
FIG. 3B represents content data.

DETAILED DESCRIPTION OF THE INVENTION

Figure 1:
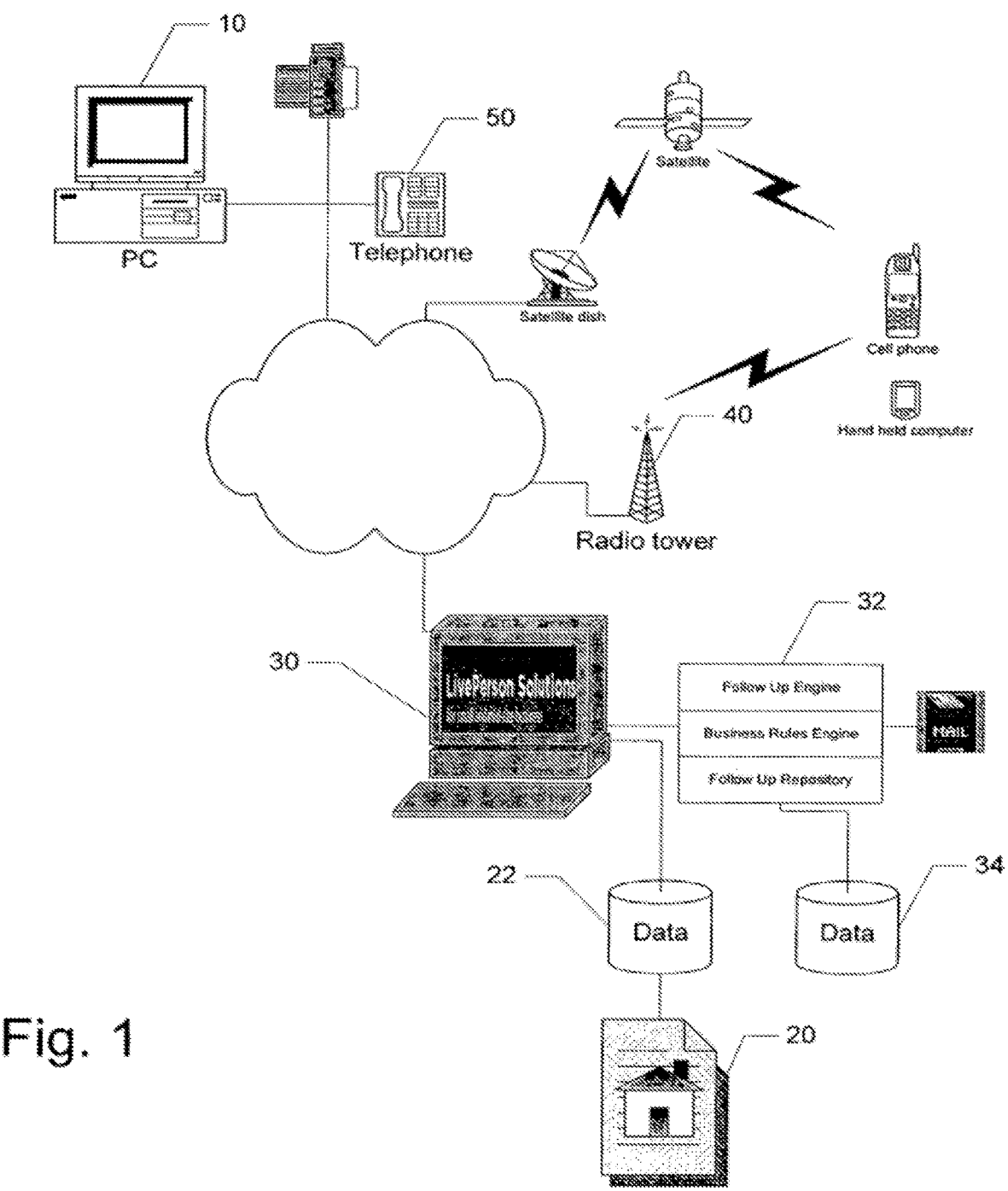
FIG. 1 System according to the present invention.

FIG. 1 depicts an embodiment of a system according to the present invention. As shown, a user 10 is connected to a web server 30 via the internet. The user 10 has additional means of communication such as a telephone 50, fax machine, cell phone, hand held computer, and the like. The web server 30 includes a database 22 which stores a plurality of web pages such as web page 20. Additionally, a module 32 is used for the application of business rules and follow up procedures. In one embodiment, module 32 is part of web server 30. In another embodiment, module 32 is housed in another computer. Module 32 accesses data from database 34. follow up records 36 are preferably stored in database 34. In one embodiment, module 32 also performs follow up functions. It should be noted that the functions of module 32 can be performed using separate modules. In one embodiment, the follow up function such as E-mail, voice-over IP, mail, and the like are routed through web server 30. In another embodiment, the follow up procedures or follow up activities are performed through another server or servers. Additionally, module 32 can cause DM mailings to be performed.

In operation, a user 10 requests a web page 20 from server 30. In the case in which user 10 has not previously requested web page 20, server 30 causes a cookie 12 (shown in FIG. 2) to be stored on the user's computer. Additionally, a follow up record 36 (shown in FIG. 3A) is created for user 10 and stored in database 34, based on the user's activity.

In the case that the user has previously accessed web page 20, the server 30 receives a cookie 12 from user 10. The cookie is processed by module 32. Module 32 determines whether the user 10 has previously stored unexpired follow up information 36 stored in database 34. In a preferred embodiment, module 32 includes a business rules engine, a follow up repository, and a follow up engine. In another embodiment, the business rules engine, follow-up repository, and follow-up engine are separate modules.

When there is follow up information 36, the module 32 retrieves the information and acts on it. In another embodiment, the follow up engine extracts information from the repository record and acts upon instructions stored in the repository record. The follow up information is used to modify the user experience. The user experience is modified by such items as chat, popups, setting system variables, setting display variables, opening a communication channel, opening an engagement channel, and the like.

The business rule engine processes, in real-time, the events associated with each user and decides what business action that is required. The business rule engine selects from one of at least three actions. If the business rule engine determines an immediate need, action is taken in real-time. If no immediate action has to be taken, follow up is scheduled for either a specific future date or upon the user's next visit. Specific actions to take include mail, both traditional and email, telephone follow up, fax, or the like. In one embodiment, the system can open a chat dialogue if the user is online using a chat agent. It should be noted that in all instances, the follow up is appropriate for the web page such as a follow up questionnaire regarding a technical problem, a replacement part being sent out if a defective component was reported, an E-mail reminder, follow-up based on the users behavior on the site, and the like. In some instances, no action is taken.

The business rules engine uses rules that are based on conditions and actions taken while a user is visiting a specified website. Certain conditions will result in specific actions being taken. The conditions include both the activities that a user that performs while on a page and the user's behavior while on a page. Rules provide a way to react to customer activity. Visitor rules customize the processing of visitors and/or people communicating via chat or another channel. In a preferred embodiment, rules are created within a specific context that determines the circumstances in which the rule will apply. The rules respond to conditions that exist. Conditions specify which actions will be triggered. It should be noted that multiple conditions can be specified or Boolean logic can be used.

TABLE 1

| Visitor Rules - Conditions | | |
| --- | --- | --- |
| Condition | Rule Type | Description |
| Browsing | | |
| Current Page | clicks to chat enters page enters site queued for chat leaves site | The URL or title of the current page match the specified pattern. |

TABLE 1-continued

Visitor Rules - Conditions

| Condition | Rule Type | Description |
|---|---|---|
| Current Page Referring URL | clicks to chat<br>enters page<br>enters site<br>queued for chat<br>leaves site | The referring URL of the current page match the specified pattern. |
| Number of Pages | clicks to chat<br>enters page<br>enters site<br>queued for chat<br>leaves site | The number of pages visited during this session. |
| Referring URL | clicks to chat<br>enters page<br>enters site<br>queued for chat<br>leaves site | Matches the referrer of the visitor's first visit to the site. |
| Search Engine Found | clicks to chat<br>enters page<br>enters site<br>queued for chat<br>leaves site | The URL from which the visitor arrived is from a search engine. |
| Search Engine Identity | clicks to chat<br>enters page<br>enters site<br>queued for chat<br>leaves site | The search engine from which the request came. |
| Survey Question | clicks to chat<br>enters page<br>enters site<br>queued for chat<br>leaves site | Response to a question in a particular survey. |
| Visited Page | clicks to chat<br>enters page<br>enters site<br>queued for chat<br>leaves site | The visitor visited a page whose URL or title matches the specified pattern. |

Chat

| Condition | Rule Type | Description |
|---|---|---|
| Available for Invitation | clicks to chat<br>enters page<br>enters site<br>queued for chat<br>leaves site | Visitor is available for a chat invitation. |
| Has Chat | clicks to chat<br>enters page<br>enters site<br>queued for chat<br>leaves site | Visitor has chatted during the current session. |
| Has Chat History | clicks to chat<br>enters page<br>enters site<br>queued for chat<br>leaves site | The visitor requested to chat in a previous visit. |
| In Chat | clicks to chat<br>enters page<br>enters site<br>queued for chat<br>leaves site | The visitor is currently involved in a chat session with an operator. |
| In Chat or Waiting for Chat | clicks to chat<br>enters page<br>enters site<br>queued for chat<br>leaves site | The visitor is currently in a chat, or waiting for a chat to be established. |
| In or After Chat | clicks to chat<br>enters page<br>enters site<br>queued for chat<br>leaves site | The visitor is currently in a chat, or has previously been in chat |
| Invited to Chat | clicks to chat<br>enters page<br>enters site<br>queued for chat<br>leaves site | The visitor has been invited to chat. |
| Refused Chat | clicks to chat<br>enters page<br>enters site | An invitation to chat been has sent to the visitor and the visitor refused to chat. |

TABLE 1-continued

Visitor Rules - Conditions

| Condition | Rule Type | Description |
|---|---|---|
| | queued for chat<br>leaves site | |
| | Miscellaneous | |
| Action Fired | clicks to chat<br>enters page<br>enters site<br>queued for chat<br>leaves site | The action with the specified name has already fired during this session. |
| At Least One Rule Triggered | clicks to chat<br>enters page<br>enters site<br>queued for chat<br>leaves site | The rule with the specified name has already been triggered during this session. |
| Predictive Dialer | enters page<br>enters site | Triggers a predictive dialer with the specified settings. A Predictive Dialer controls the number of invitations sent to site visitors. |
| Random Number | clicks to chat<br>enters page<br>enters site<br>queued for chat<br>leaves site | A random integer between 0 and the specified number. |
| Rule Triggered | clicks to chat<br>enters page<br>enters site<br>queued for chat<br>leaves site | The outcome with the specified rule has already been triggered during this session. |
| | Operators | |
| Available Operators | clicks to chat<br>enters site<br>leaves site | At least one operator is online, (i.e., is the operator in the "online" state, not "away" or "back in 5"). |
| Number of Operators Available | clicks to chat<br>enters site<br>leaves site | The Number of available operators available. |
| Online Operators | clicks to chat<br>enters site<br>leaves site | Operators are currently in the "online" state. An operator that is "away" or "back in 5" is not considered online. |
| Room Operators Online | clicks to chat<br>enters site<br>leaves site | There is at least one operator of the skill specified online in the current visitor's Room. |
| Skill Operators Available | clicks to chat<br>enters page<br>enters site<br>queued for chat<br>leaves site | There is at least one operator of the specified skill available. |
| Skill Operators Online | clicks to chat<br>enters page<br>enters site<br>queued for chat<br>leaves site | There is at least one operator of the specified skill online. |
| | Time Functions | |
| Day of the Week | clicks to chat<br>enters page<br>enters site<br>queued for chat<br>leaves site | The day of the week. |
| Days Since Last Click-to-Chat | clicks to chat<br>enters page<br>enters site<br>queued for chat<br>leaves site | The number of days since the last time this visitor has requested to chat. |
| Days Since Last Visit | clicks to chat<br>enters page<br>enters site<br>queued for chat<br>leaves site | The number of days since the visitor's last visit to the site (fails if this is the first visit). |
| Invitation History (cross session) | clicks to chat<br>enters page<br>enters site<br>queued for chat<br>leaves site | The number of seconds for the visitor to be invited to chat. This condition also checks the visitor's previous sessions. To check chat invitations only in the current session use "Invited to Chat" or "Time Since Last Invite" |

TABLE 1-continued

Visitor Rules - Conditions

| Condition | Rule Type | Description |
| --- | --- | --- |
| Invitation Timeout | clicks to chat enters page enters site queued for chat leaves site | The number of seconds the Invitation to chat timed out. If the last invitation did not timeout, the condition will always be false. |
| Seconds in Current Page | clicks to chat enters page enters site queued for chat leaves site | The number of seconds the visitor was on the current page. |
| Seconds Since Decline | clicks to chat enters page enters site queued for chat leaves site | The number of seconds since the visitor was declined. |
| Seconds Since Last Visit to Page | clicks to chat enters page enters site queued for chat leaves site | The number of seconds since the visitor last visited a page that matches the specified pattern. |
| Time In Site | clicks to chat enters page enters site queued for chat leaves site | The time in seconds that the visitor spent in the site during this session. |
| Time of the Day | clicks to chat enters page enters site queued for chat leaves site | The number of minutes elapsed since midnight, Eastern Standard Time, today. |
| Time Since Action Fired | clicks to chat enters page enters site queued for chat leaves site | The time in seconds since the specified action fired. |
| Time Since Custom Variable Modified | clicks to chat enters page enters site queued for chat leaves site | The time in seconds since the custom variable was modified. |
| Time Since Last Invite | clicks to chat enters page enters site queued for chat leaves site | The time in seconds since the visitor's last invite. |
| Time Since Rule Fired | clicks to chat enters page enters site queued for chat leaves site | The time in seconds since the rule fired. |
| Wait Time | clicks to chat enters page enters site queued for chat leaves site | The time in seconds that the visitor has been in the queue. |

Variables

| | | |
| --- | --- | --- |
| All Values of Custom Variable | clicks to chat enters page enters site queued for chat leaves site | Apply the comparison to All values of the specified Custom Variable. All values must be Numeric and satisfy the comparison condition. |
| At Least One Numeric Value of Custom Variable | clicks to chat enters page enters site queued for chat leaves site | The Custom Variable has at least one value that satisfies the comparison condition. Enter custom variable name in the first field, and number to match in the last field. |
| At Least One Value of Custom Variable | clicks to chat enters page enters site queued for chat leaves site | The Custom Variable has at least one value that satisfies the comparison condition. Enter custom variable name in the first field, and number to match in the last field. |
| Custom Flag Variable | clicks to chat enters page enters site | The custom flag variable satisfies the comparison condition. |

TABLE 1-continued

| Condition | Rule Type | Description |
|---|---|---|
| | queued for chat | |
| | leaves site | |
| Custom Variable | clicks to chat enters page enters site queued for chat leaves site | The value of the Custom Variable that corresponds to the specified name |
| Custom Variable Has Been Set | clicks to chat enters page enters site queued for chat leaves site | A Custom Variable with the specified name has been set. |
| Custom Variable an Current Page | clicks to chat enters page enters site queued for chat leaves site | There is a Custom Variable on the current page. |
| Numeric Custom Variable | clicks to chat enters page enters site queued for chat leaves site | Apply the comparison to All values of the specified Custom Variable. All values must be Numeric and satisfy the comparison condition. |
| Numeric Values of Custom Variable | clicks to chat enters page enters site queued for chat leaves site | The numeric value of the Custom Variable with the specified name (fails if Custom Variable has not occurred or the value is not numeric). Enter Custom Variable name in the first field, and number to match in the last field. |
| Visitor Properties | | |
| Browser Type (User Agent) | clicks to chat enters page enters site queued for chat leaves site | The visitor's browser matches the specified pattern. |
| Hot Lead | clicks to chat enters page enters site queued for chat leaves site | Visitor is specified as a hot lead. |
| IP | clicks to chat enters page enters site queued for chat leaves site | The visitor's IP address or host-DNS matches the specified pattern. |
| Repeat Visit | clicks to chat enters page enters site queued for chat leaves site | This visitor has been to the site before this session. |
| Skill | clicks to chat enters page enters site queued for chat leaves site | The visitor's skill group. |
| Visitor Group | clicks to chat enters page enters site queued for chat leaves site | The group number for this visitor, if all visitors are grouped into groups. The site visitors are randomly segmented into the number of groups you set in the 3rd parameter. You can then check to which specific group the visitor has been assigned. |

Conditions may include the type of page, section of a page or a specific URL, can trigger a specific condition. Additionally, if the user reaches a page via a hyperlink or by typing a URL, that condition may be monitored. The time a user spends on a specific page may also be a condition. For example, the system can monitor whether a user spends more or less than a specified time on a page or group of pages. Matching pages can also be in a condition as are negative conditions such as whether a user has been on a page, added items to a cart but taken no further action, or not gone to a checkout.

The rules also include variables which can be a value or an occurrence. For example, the value or occurrence may be a shopping cart total greater than a specified dollar amount or contain more or less than a specified amount/quantity. Further, other variables can include was there a transaction error (a yes or no variable). The system can also monitor at least such items as an occurrence of a specified event, entering a communication channel such as chat before or after a selection, days since chat, and the like. Further, other variables can be a new visitor, old visitor, user's IP address, and the like.

The user's IP address can be important for business reasons such as identifying a competitor and limiting access to that user. For example, if the website is a telecommunication company and a user logs on from a competitor company, access can be limited until that user signs in with a user name and password, thereby designating that that person is a customer. Likewise, this may happen in the banking community where a first bank will limit access to employees of a second bank unless they are customers of the first bank.

In a preferred embodiment, the follow up engine is responsible for both online and offline activities. When visitor arrives at the website, the follow up engine determines whether the visitor 10 has unexpired follow up information 36 in the repository 34. In those cases when there is information, the information 36 is retrieved and acted upon. Once the record 36 is retrieved, data is extracted from the repository record 36. The extracted data includes visitor ID, account ID, session ID, Ticket ID, follow up date, expiration date, recovery mode, and content.

When a visitor interacts with the website, the follow up engine determines whether to set or add follow up information to the user's follow up record 36 and determines the expiration date for that information. When the visitor interacts with the website, the follow up engine will store the expiration date of the visitor's follow up record 36 on the visitor's cookie 12. In this manner, when the user returns, the engine can efficiently detect that the visitor has follow up information 36.

Follow up records 36 in the database 34 may have a trigger date. On the trigger date, the record is retrieved and acted upon by the follow up engine. At that time the engine sending outbound email, initiates outbound phone calls, initiating an offline channel activity (e.g. DM mailing), sending instructions to agents to take action, or the like.

The follow up repository is a data repository. Preferably hosted on a database, that associates visitor-identifying information with follow up content. The repository provides data management services to control the size and aging of the stored items. In particular, items can be marked with expiration date and can have size limits.

FIG. 2 is representative of a cookie 12 created by server 30 and stored on user's 10 computer. The cookie preferably includes a visitor ID, a date the record was set, and a database record expiration date. Thus, when user 10 visits website 20, the cookie identifies the user as well as the date the cookie was created. Further, the cookie includes the date the record in database 34 expires. Thus, if user 10 returns to website 20 after the record 36 expires, there is no need to retrieve the follow up record. In this manner, resources are conserved. Due to the high volume of traffic hosted by a typical web server, if the web server had to retrieve a record for every user or, in the alternative, search its database every time a user enters the website, the resources available to the web server would be taxed.

FIG. 3 represents the data string stored in database 34 created by module 32. The record 36 is formed based from the actions of user 10 on web page 20. The record 36, as discussed above, includes the visitor ID which is the same ID stored in cookie 12. In addition to the visitor ID, the record 36 includes the user's account ID, if one exists for web page 20. If user 20 does not have an account on web page 20, in one embodiment, a provisional account number is assigned to user 10 that correlates with the visitor ID.

The session ID is an ID for the user's current login session. This session ID is a log that records the user's time on the site. For example, the session ID may represent a log entry signifying the time and date the user utilizes the website. Alternatively, the session ID may be no more than a counter indicating the number visitor the user is. The ticket ID is, in a preferred embodiment, a service ticket ID number. The service ticket number represents a service to be performed. For example, if a user requires a service call, the ticket ID would include the service ticket number for the repair man to visit the user's home, office, or the like.

Record 36 also includes a follow up date and an expiration date. These two dates work hand-in-hand to provide follow up to user 10. Based on the user's activity, a specific follow up activity or set of follow up activities are determined. However, these follow up activities are preferably only good until the expiration date in record 36. Once the expiration date is met, the follow up prescribed by the record is no longer valid. In one embodiment, the follow up engine uses the previously determined follow up activity as a starting point for any future follow ups.

The recovery mode is used to determine what action to take given certain error circumstances. For example, the recovery mode relates to how a system deals with internal inconsistencies. For example, if the cookie contains a record indicating that there should be follow-up if there is nothing in the database or, if the record states that there should be one record but in the database there are two records, the system must know how to deal with the internal inconsistency. A first way to deal with any inconsistency is not to fix anything or, to ignore the record. Alternatively, the system can try to fix the record on read or on write. Additionally, the system can self correct. For example, if there is more than one record, the most recent record will be used.

The content in the extracted data, shown in FIG. 3B, includes the follow-up activity. In other words, the content is what action will be taken upon follow-up. In a preferred embodiment, the content is an XML, instruction. Potential content includes pop-up messages, slide shows, variables to be set relating to the users last visit, and the like. In one embodiment, the system monitors the follow up date in the record. When the follow up date is reached, the follow up action, if not through the web site, is taken such as a follow up call, email, letter, or the like.

As discussed above, when certain conditions occur, an action is triggered. Actions may contain subactions. In one embodiment, the actions are executed in a specific order. However, in another embodiment, the actions occur in random or non-specified order. A sample of actions based on rules and alerts are shown below in Table 2.

TABLE 1

Visitor Rules - Conditions

| Type | Rule Type | Action | Parameters | Description |
| --- | --- | --- | --- | --- |
| Operator Alerts | clicks to chat<br>enters page<br>enters site<br>queued for chat | Operator Alert | | Send an alert to operators concerning this visitor. For a list of macros available in Operator Alerts, refer to the LivePerson Customer Center. |

TABLE 1-continued

Visitor Rules - Conditions

| Type | Rule Type | Action | Parameters | Description |
|---|---|---|---|---|
| | leaves site<br>browsing site | | Description<br><br>HTML | Enter a brief description of the operator alert, if you so wish.<br>Use the HTML box to design your alert. Plain text can be used in this area, but HTML tagging will serve to make the alert more eye-catching. |
| Chat Audit | clicks to chat<br>enters site<br>leaves site | Email this Transcript | Email<br>Sender Name<br>Sender Email<br>Subject | Email a copy of the chat transcript to the specified address. The email will arrive from the specified sender. Set the subject to help you identify the email. |
| | | Forward transcript from visitor email | Email<br>Subject<br>Email Custom Variable | Email a copy of the chat transcript to the specified address. The email will arrive from the email associated with the visitor. You can optionally set the custom variable to be used to extract the visitor's email address (Email Custom Variable). |
| Visitor Experience | clicks to chat<br>enters page<br>enters site<br>leaves site<br>browsing site | Engage Visitor | NA | Send a proactive chat request to a visitor. |
| | | Custom Engage Visitor | <custom directory> | Engage visitor using custom image directory. The directory should not end with a "/". |
| | | Set Visitor Profile | <name of visitor profile> | Assign the session to a selected Visitor Profile. |
| | | Enable/Disable Pre-Chat Survey | Pre-Chat Survey | Enable/Disable Pre-Chat survey status for the visitor during current session. |
| | | Enable/Disable Exit Survey | Exit Survey | Enable/Disable the Exit survey status for the visitor during current session. |
| | | Enable/Disable Operator Survey | Operator Survey | Enable/Disable the Operator survey status for the visitor during current session. |
| | | Set Pre-Chat survey | <name of pre-chat survey> | Set specific Pre-Chat survey for the visitor during current session. |
| | | Set Exit survey | <name of exit survey> | Set specific Exit survey for visitor during current session. |
| | | Set Operator survey | <name of operator survey> | Set specific Operator survey for visitor during current session. |
| | | Set Offline survey | <name of offline survey> | Set specific Offline survey for the visitor during current session. |
| | | Set Chat Window | <name of chat window> | Set a specific Chat Window profile for the visitor during current session. |
| | | Set System Messages | <name of system message set> | Set specific System Messages set for the visitor during the current session. |
| | enters page | Show Popup | <popup> | Display a pop-up. New pop-ups are created in the Content Library. |
| | enters page | Engage Visitor | NA | Send a proactive chat request to a visitor. |
| | enters page | Custom Engage Visitor | <custom directory> | Engage visitor using custom image directory. The directory should not end with a "/". |
| | enters page | Show Warm-up | <pop up> | Use the Content Library tab to define new warm-ups. |
| Variables | clicks to chat<br>enters page<br>enters site<br>queued for chat<br>leaves site<br>browsing site | Set Custom Variable | Variable Name<br>Variable Value | Add a custom variable to the session. |
| | | Set Custom Flag Variable | Flag Name<br>State On<br><HelvBold> \| Off | Add an on/off custom variable to the session. |
| | | Set Custom Variable One Time Only | Variable name<br>Variable Value | Add a custom variable to the session. This action will only fire once per session. |
| Routing | queued for chat | Assign to Service Queue | <Service Queue> | Change the visitor's service queue. |
| | | Assign Percentage to Service Queue | <Service Queue> | Assign a percentage of visitors to a queue. Use several of these outcomes together to create a distribution plan for a group of visitors. Note that visitors will only be assigned if the queue is online for the Skill Group. |

TABLE 1-continued

Visitor Rules - Conditions

| Type | Rule Type | Action | Parameters | Description |
|---|---|---|---|---|
| Sales Edition | click to chat enters site | Set Visitor as Hot Lead | NA | Visitor is defined as a hot lead. |
| | queued for chat browsing site | Increment Reporting Counter | <file location> | Include specified words that can be viewed in the Conversion reports. Counters are defined in Rules > Words > Report Counters. |
| | | Set Visitor Segment | <segment name> | Set the visitor Segment |

Figure 4:
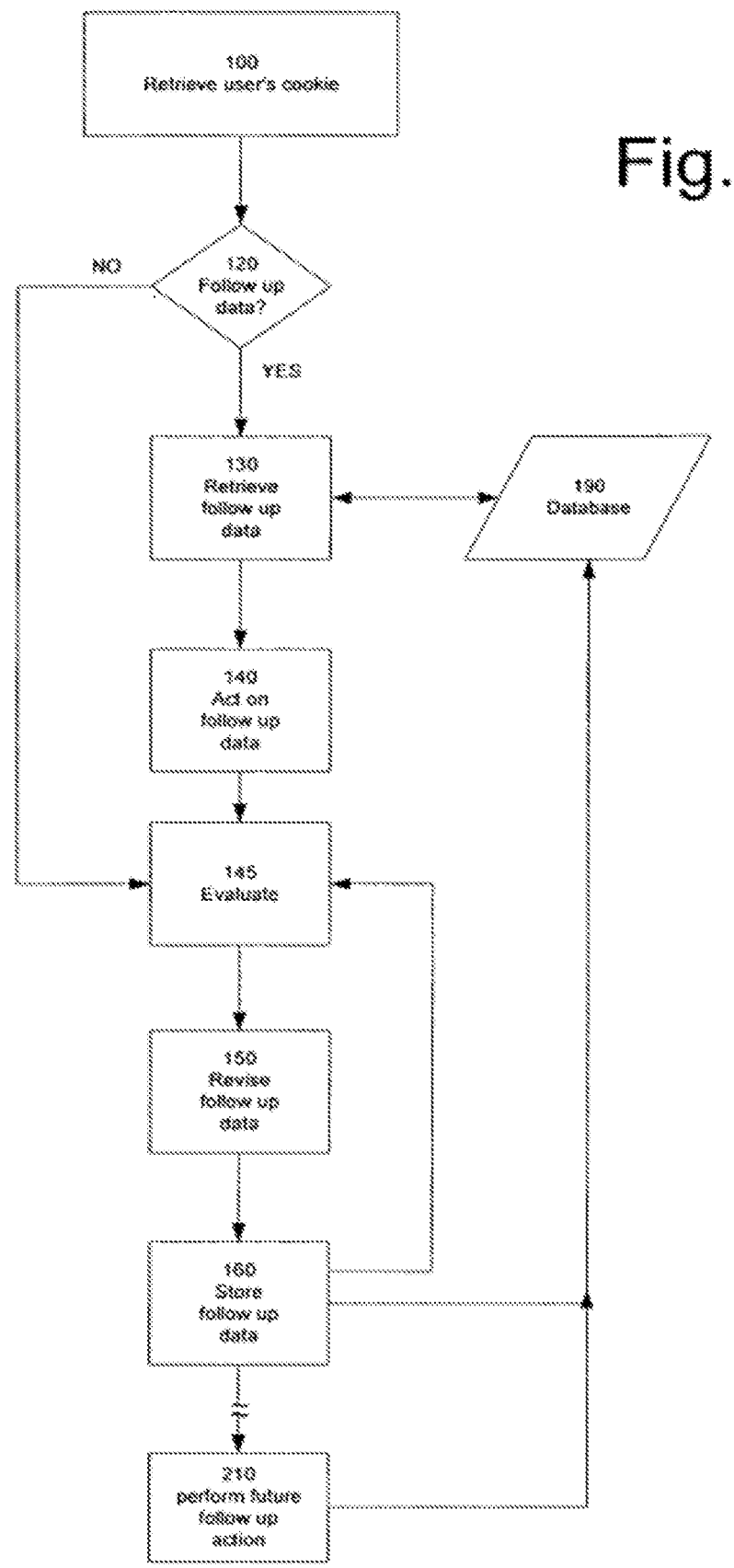
FIG. 4. is a flowchart of the method of user interaction according to the present invention.

FIG. 4 depicts a flow chart according to the present invention. According to one embodiment of the present invention, in step 100, when a user visits a website, the web site server retrieves a cookie specific for that website, if any. In step 120, the system determines whether or not the user has follow up data stored in the system. If the user has follow up data on the system based on the cookie retrieved from the user. Such follow up data is retrieved from database 190 in step 130. The system then acts on the follow up data in step 140. The user's interaction on the site are evaluated in step 145 and, based on subsequent actions by the user on the given website, the follow up data is revised in step 150. The revised follow up data is then saved in database 190. Subsequent to the storage of any required follow up, at the appropriate time, the required future follow up action is taken in step 210. This follow up action can include a telephone call, an email, a facsimile, a mailing, or the like.

In those cases when the user does not have any active follow up actions or the follow up record is expired, the users actions are evaluated, and if required, a new follow up record is created in step 170. Subsequently, the new record is stored in database 190 in step 180. Then, based on the user's activity on the give web page, any additional follow up activity is revised and stored. Subsequently, any future follow up activity is performed in step 210.

It should be noted that, in the present system, database access is performed for only those visitors that warrant special treatment. In this manner, valuable resources are conserved because multiple database queries are not performed. Thus, multiple database look-ups are performed only for those users requiring special attention or specified interaction. The interaction is based on previous sessions already stored in the server's database. Thus, no real-time decisions are required for present user interactions.

In addition to the three modules discussed above, several other features can be used to improve system performance including caching, read buffering, and write buffering.

Figure 5:
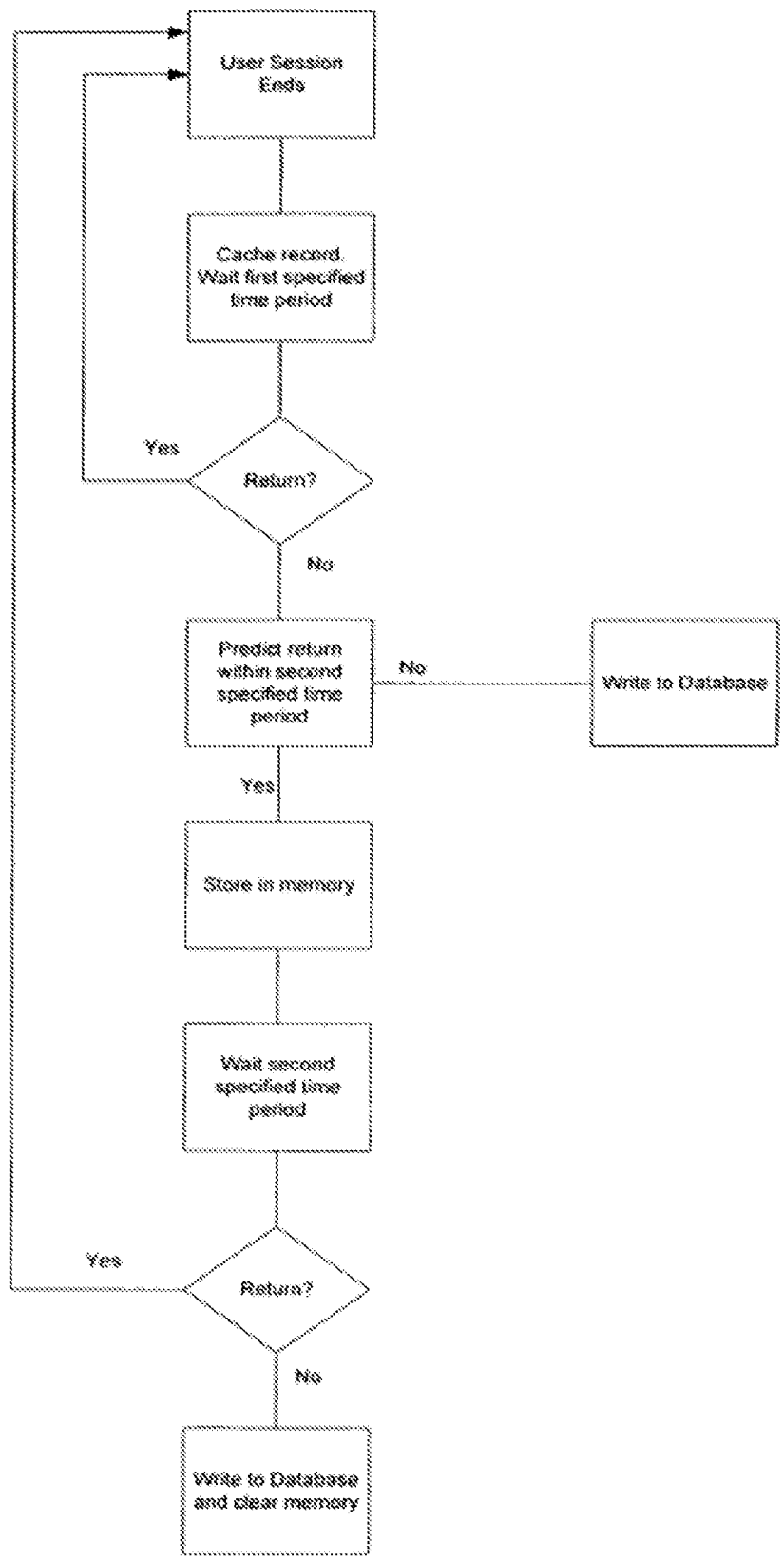
FIG. 5 is a flowchart of the method to store a record.

To efficiently utilize system resources, records are preferably not immediately written into the database. As shown in FIG. 5, after a user's session ends, the system waits one hour. In other embodiments, other amounts of time are used. After the one hour time limit, the system uses heuristics to predict whether the user will return within 24 hours. This prediction is based on the user's activities on the website and the like. If the system predicts that the user will not return within the next 24 hours, the record is immediately written to the database. If the system determines that it is likely that the user will return within the next 24 hours, the record is kept in memory. In a preferred embodiment, the record is kept in memory for 24 hours. After 24 hours, or another predetermined time period, the record is written to the database and the memory is cleared.

By maintaining the record in memory, valuable system resources are conserved because the system does not have to send the record to the database and write those records to the database. Thus, communication bandwidth as well as database record space is preserved. Additionally, if the user returns within the prescribed time period while the record is still in memory, the time to access the record is greatly reduced. As shown in FIG. 5, once a user session ends, the record is cached and a first time period begins where the system waits to see if the user returns. Typically, this first time period is approximately 1 hour. If the user returns during this time period, the system monitors the user's activity until the user's session ends again. If the user does not return, the system predicts if the user will return during a second time period, typically 24 hours. If the user will not likely return during the prescribed time period, the record is written to the database. If the user will likely return, the record is stored in memory. During this time period, the user's return is monitored. If the user returns, the session continues until of the new session or, after the prescribed time period, the record is written to the database and the memory is cleared.

In the preferred embodiment, to conserve data storage requirements, records are saved to a partition. In this manner, when a set of records are to be deleted, the partition corresponding to the set of records to be deleted is cleared. Preferably, the partitions are sorted by date and are erased every 30 days.

Heuristics are employed to estimate which follow up records will be accessed more frequently, and estimate the likelihood that a visitor will return to the site within the next 24 hours. In this way, records are readily accessible to the system. If a record will not be accessed within 24 hours, it is written to the database. For efficient database updating, write requests are buffered so that multiple follow up records are stored to the database in one operation. Once record expires, it is preferably removed from the database. Finally, read requests are buffered such that the server performs read operations only at a certain rate, for example not more frequently than 5 times per second.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

In the specification, the term "media" means any medium that can record data therein. The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the above mentioned apparatus maybe accomplished by programming functions of the above mentioned apparatuses with a programming language readable by a computer or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device, any suitable device for performing computations in accordance with a computer program may be used. Examples of such devices include a personal computer, a laptop computer, a microprocessor, a programmable logic device, or an application specific integrated circuit.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A computer-implemented method, comprising:
receiving a request to access a web page, wherein the request is associated with a user device, and wherein the user device has not previously accessed the web page;
storing a cookie on the user device;
monitoring real-time events associated with the user device, wherein the real-time events are monitored in real-time as the user device interacts with the web page;
dynamically generating a follow up record in real-time as the real-time events occur, wherein the follow up record indicates a follow up activity to be performed during a subsequent visit to the web page by the user device;
associating the follow up record with the cookie, wherein during the subsequent visit, the cookie is used to retrieve the follow up record for performance of the follow up activity;
generating a prediction as to whether the subsequent visit will occur within a first pre-defined time period, wherein the prediction is generated after a second pre-defined time period corresponding to an end to a user device session on the web page, wherein the prediction is generated based on the real-time events, and wherein the prediction is used to select a storage method for storing the follow up record; and
storing the follow up record according to the storage method.

2. The computer-implemented method of claim 1, wherein:
the prediction indicates that the user device will return to the web page within the first pre-defined time period; and
the storage method includes storing the follow up record in memory for a duration of the first pre-defined period.

3. The computer-implemented method of claim 1, wherein:
the prediction indicates that the user device will not return to the web page within the first pre-defined time period; and
the storage method includes storing the follow up record in a database.

4. The computer-implemented method of claim 1, wherein the follow up activity corresponds to an offline channel activity that is to be performed using a communication method during the subsequent visit to the web page.

5. The computer-implemented method of claim 1, wherein the cookie indicates an expiration date associated with the follow up record, and wherein when the cookie is retrieved during the subsequent visit, the expiration date is used to determine whether the follow up record is expired.

6. The computer-implemented method of claim 1, wherein the follow up record includes an Extensible Markup Language (XML) instruction, and wherein the XML instruction causes the follow up activity to be performed during the subsequent visit.

7. The computer-implemented method of claim 1, wherein the follow up activity includes sending instructions to one or more agents to take an action during the subsequent visit to the web page.

8. A system comprising:
a processor; and
a non-transitory computer-readable storage medium containing instructions configured to cause the processor to perform operations including:
receiving a request to access a web page, wherein the request is associated with a user device, and wherein the user device has not previously accessed the web page;
storing a cookie on the user device;
monitoring real-time events associated with the user device, wherein the real-time events are monitored in real-time as the user device interacts with the web page;
dynamically generating a follow up record in real-time as the real-time events occur, wherein the follow up record indicates a follow up activity to be performed during a subsequent visit to the web page by the user device;
associating the follow up record with the cookie, wherein during the subsequent visit, the cookie is used to retrieve the follow up record for performance of the follow up activity;
generating a prediction as to whether the subsequent visit will occur within a first pre-defined time period, wherein the prediction is generated after a second pre-defined time period corresponding to an end to a user device session on the web page, wherein the prediction is generated based on the real-time events, and wherein the prediction is used to select a storage method for storing the follow up record; and
storing the follow up record according to the storage method.

9. The system of claim 8, wherein:
the prediction indicates that the user device will return to the web page within the first pre-defined time period; and
the storage method includes storing the follow up record in memory for a duration of the first pre-defined period.

10. The system of claim 8, wherein:
the prediction indicates that the user device will not return to the web page within the first pre-defined time period; and
the storage method includes storing the follow up record in a database.

11. The system of claim 8, wherein the follow up activity corresponds to an offline channel activity that is to be performed using a communication method during the subsequent visit to the web page.

12. The system of claim 8, wherein the cookie indicates an expiration date associated with the follow up record, and wherein when the cookie is retrieved during the subsequent visit, the expiration date is used to determine whether the follow up record is expired.

13. The system of claim 8, wherein the follow up record includes an Extensible Markup Language (XML) instruction, and wherein the XML instruction causes the follow up activity to be performed during the subsequent visit.

14. The system of claim 8, wherein the follow up activity includes sending new instructions to one or more agents to take an action during the subsequent visit to the web page.

15. A computer-program product tangibly embodied in a non-transitory machine-readable medium including instructions configured to cause a data processor apparatus to perform operations including:
receiving a request to access a web page, wherein the request is associated with a user device, and wherein the user device has not previously accessed the web page;

storing a cookie on the user device;
monitoring real-time events associated with the user device, wherein the real-time events are monitored in real-time as the user device interacts with the web page;
dynamically generating a follow up record in real-time as the real-time events occur, wherein the follow up record indicates a follow up activity to be performed during a subsequent visit to the web page by the user device;
associating the follow up record with the cookie, wherein during the subsequent visit, the cookie is used to retrieve the follow up record for performance of the follow up activity;
generating a prediction as to whether the subsequent visit will occur within a first pre-defined time period, wherein the prediction is generated after a second pre-defined time period corresponding to an end to a user device session on the web page, wherein the prediction is generated based on the real-time events, and wherein the prediction is used to select a storage method for storing the follow up record; and
storing the follow up record according to the storage method.

16. The computer-program product of claim 15, wherein:
the prediction indicates that the user device will return to the web page within the first pre-defined time period; and
the storage method includes storing the follow up record in memory for a duration of the first pre-defined period.

17. The computer-program product of claim 15, wherein:
the prediction indicates that the user device will not return to the web page within the first pre-defined time period; and
the storage method includes storing the follow up record in a database.

18. The computer-program product of claim 15, wherein the follow up activity corresponds to an offline channel activity that is to be performed using a communication method during the subsequent visit to the web page.

19. The computer-program product of claim 15, wherein the cookie indicates an expiration date associated with the follow up record, and wherein when the cookie is retrieved during the subsequent visit, the expiration date is used to determine whether the follow up record is expired.

20. The computer-program product of claim 15, wherein the follow up record includes an Extensible Markup Language (XML) instruction, and wherein the XML instruction causes the follow up activity to be performed during the subsequent visit.

21. The computer-program product of claim 15, wherein the follow up activity includes sending new instructions to one or more agents to take an action during the subsequent visit to the web page.

* * * * *